(12) United States Patent
Nicol

(10) Patent No.: US 9,162,523 B2
(45) Date of Patent: Oct. 20, 2015

(54) AERODYNAMIC COVER CAP FOR USE IN TWO-WHEELED VEHICLES

(76) Inventor: Morgan Nicol, Collina d'Oro (CH)

(*) Notice: Subject to any disclaimer, the term of this patent is extended or adjusted under 35 U.S.C. 154(b) by 412 days.

(21) Appl. No.: 13/638,329

(22) PCT Filed: Mar. 29, 2011

(86) PCT No.: PCT/EP2011/001562
§ 371 (c)(1),
(2), (4) Date: Dec. 17, 2012

(87) PCT Pub. No.: WO2011/124342
PCT Pub. Date: Oct. 13, 2011

(65) Prior Publication Data
US 2013/0200683 A1    Aug. 8, 2013

(30) Foreign Application Priority Data

Mar. 30, 2010  (DE) .......................... 10 2010 013 563
Jun. 4, 2010   (DE) .......................... 10 2010 022 771

(51) Int. Cl.
*B60B 7/00*   (2006.01)
*B60B 1/04*   (2006.01)

(52) U.S. Cl.
CPC .............. *B60B 7/0026* (2013.01); *B60B 1/045* (2013.01); *B60B 7/0006* (2013.01); *B60B 2900/1216* (2013.01); *B60Y 2200/134* (2013.01)

(58) Field of Classification Search
CPC .......... B60B 1/04; B60B 1/043; B60B 1/044; B60B 1/045; B60B 21/06; B60B 21/062; B60B 2900/1216
USPC ....................... 301/58, 61, 70, 104
See application file for complete search history.

(56) References Cited

U.S. PATENT DOCUMENTS

| | | | | |
|---|---|---|---|---|
| 4,682,820 | A * | 7/1987 | Stalter | 301/37.26 |
| 5,061,013 | A * | 10/1991 | Hed et al. | 301/64.704 |
| 5,350,221 | A * | 9/1994 | Pearce et al. | 301/104 |
| 5,464,276 | A * | 11/1995 | Ott | 301/37.34 |
| 5,893,614 | A | 4/1999 | Dennis | |
| 6,036,281 | A | 3/2000 | Campbell | |
| 6,464,303 | B2 * | 10/2002 | Stembridge | 301/37.31 |
| 7,140,696 | B1 | 11/2006 | Guzik et al. | |
| 8,113,593 | B2 * | 2/2012 | Spahr et al. | 301/58 |
| 2003/0062762 | A1 | 4/2003 | Dietrich | |
| 2004/0164606 | A1 * | 8/2004 | Chase | 301/37.11 |
| 2004/0222689 | A1 | 11/2004 | Okajima | |
| 2007/0205653 | A1 | 9/2007 | Okajima et al. | |
| 2010/0007197 | A1 * | 1/2010 | Pascal et al. | 301/37.33 |
| 2010/0052408 | A1 * | 3/2010 | Ren | 301/5.1 |

FOREIGN PATENT DOCUMENTS

DE    8912607    2/1990
JP    60174302   9/1985

OTHER PUBLICATIONS

International Search Report from priority application PCT/EP2011/001562.

*Primary Examiner* — S. Joseph Morano
*Assistant Examiner* — Jean Charleston
(74) *Attorney, Agent, or Firm* — Greer, Burns & Crain, Ltd.

(57) ABSTRACT

An attachment for two-wheeled vehicles and a wheel for a two-wheeled vehicle having these attachments are provided. The wheel includes a hub, a rim and separate spokes connecting the hub and the rim. Portions of the spoke nipples protruding radially inwardly from the rim are covered by cover caps. The cover cap is configured small in structure and aerodynamic in shape. To this end, the length in t

* cited by examiner he peripheral direction is larger than the width.

13 Claims, 3 Drawing Sheets

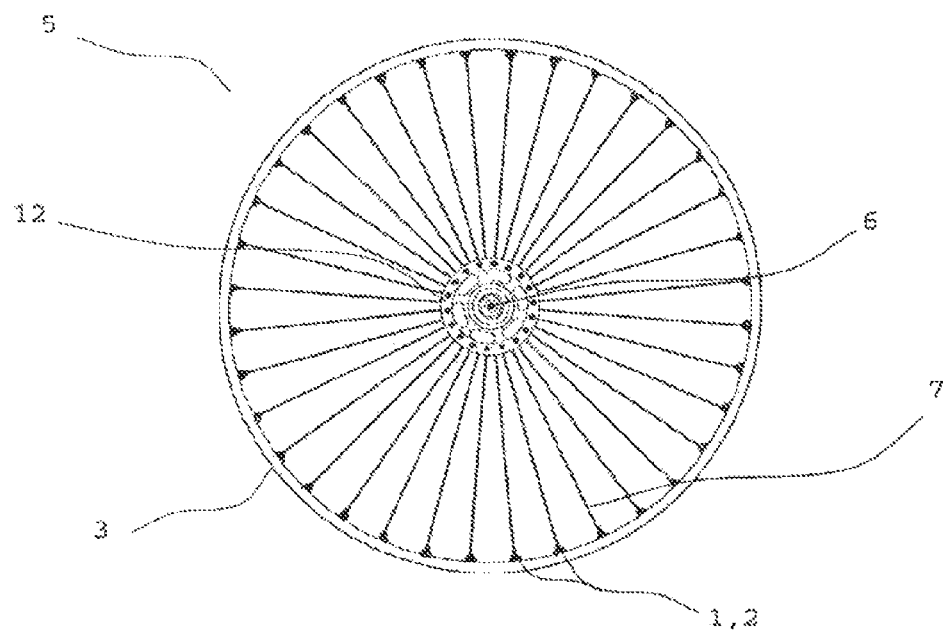
Fig. 1
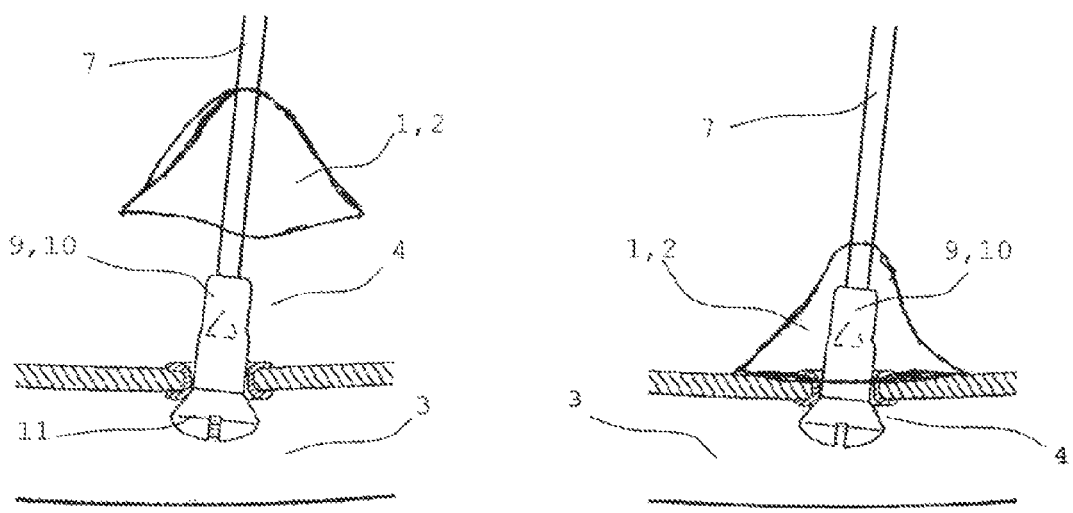
Fig. 2                    Fig. 3

AERODYNAMIC COVER CAP FOR USE IN TWO-WHEELED VEHICLES

BACKGROUND

The present invention relates to an attachment for use with a two-wheeled vehicle, and to a wheel for a two-wheeled vehicle having such attachments. In particular is the invention related to a bicycle which may be assisted by an electric or another motor. Drive or assistance through other motors is possible as well.

Present-day two-wheeled vehicles in general and bicycles in particular both for recreational and professional uses are expected to satisfy elevated requirement levels. A fundamental aspect is concerned with the most efficient propulsion of a bicycle possible. This is the case in particular on a professional scale since minute advantages may already significantly affect the results of competitions.

For example the weight of the bicycle with all of the attachments, a low rolling resistance, and in particular aerodynamics play the largest role. Specifically in racing even minimal savings in weight or improvements of aerodynamics may lead to significant competitive advantages. These areas are directly interrelated so as to be of specific interest regarding further developments in these fields.

Furthermore, advantages in aerodynamics are currently a major issue among other things in bicycles having an auxiliary motor. These motor-assisted, two-wheeled vehicles are gaining popularity not only with the elderly but in particular with long-distance riders and for use in mountainous regions. Commuting workers also increasingly use these bicycles. In this conjunction enhanced aerodynamics will increase the operational range of two-wheeled vehicles and thus the service life of the battery.

Air turbulences in all kinds of different places play a role in aerodynamics. Bicycle racers use for example special tight-fitting clothes and they assume an aerodynamic riding position on the bicycle, employing special handlebars. In this way they decrease drag to achieve better performance.

Air turbulences at the bicycle itself should also be avoided as much as possible or minimized. One of the problems is associated with the wheels.

A classical bicycle wheel consists of a central hub having mounting points for spokes formed on both sides thereof. The spokes are hooked into holes in these mounting points and fastened on the other side to so-called spoke nipples guided through or into the rim. The spoke side facing the spoke nipple has a thread which is screwed into an internal thread of the spoke nipple. This system allows to vary the spoke tension and thus adjust the wheel optimally.

For adjusting the spoke tension a range of variants has become known. For example it is possible to have the spoke nipple, which is up to 10 or 20 mm in length and approximately 3 mm to 8 mm in diameter, slightly protrude radially inwardly from the rim. The protruding portion has a number of flat faces. This allows great ease of externally adjusting the spoke tension using a dedicated tool. The drawback of this is, however, that the protruding portions of the spoke nipples cause undesirable aerodynamic effects since air turbulences occur at the flat spoke nipple faces. The exposed spoke nipple portions at the top of the wheel will move at approximately double the bicycle speed so as to effectively quadruple the drag, which is a drawback.

From EP 0 808 728 B1, a device having a pair of cover rings has become known. The two specifically configured cover rings cover the entire inner radius of the rim and the spoke nipples of the conventional spoke wheel at their centers. This type of cover involves the drawback, however, that the large shaped parts considerably increase the total weight of the wheel and that they are not suitable for all the rims since they must be specifically manufactured to a given inner rim radius and to the corresponding spoke distances. This does not only make the solution heavy in weight but expensive as well.

Another option for mounting the spokes to the spoke nipples is known specifically for present-day wheels of fiber-reinforced plastic. Again in this case the extremely thin spokes are screwed into spoke nipples and tensioned or released by way of rotating the spoke nipple. However, the spoke nipples in this variant tend to lie entirely inside the hollow rim. An advantage thereof are considerably improved aerodynamics since no undesirable air turbulences can occur at the spoke nipples.

A particular drawback of this type of fastening is the particularly intricate tensioning of the wheel. For readjusting the spoke tension it may be necessary to remove from the rim the jacket, the tube, and the rim tape so as to modify the spoke tension from the inside for example by means of a screwdriver. When wheel adjustment is finished, all the parts must be reassembled. This is complicated and requires much time. Adhesive-bonded tube tires require still more efforts.

DE 8 912 607 describes aerodynamic spoke covers intended to reduce the spoke drag in the radially outwardly region. To this end, streamlined elements are placed onto the spokes. The drawback of this cover type is the large size which has a negative influence on the total weight. These covers are furthermore highly susceptible to side-wind effects and may twist in side winds. A simpler and more reliable method is to use blade spokes.

Furthermore, aerodynamic wheels of fibrous composite materials have become known which are manufactured integrally for example as three-spoke wheels. The drawback of this construction type is, however, that manufacturing these wheels involves manual labor which makes them very expensive. Moreover, three-spoke wheels are highly susceptible to side-winds and due to the integral manufacturing the spoke tension cannot be readjusted.

SUMMARY

It is therefore the object of the present invention to allow a structure of an aerodynamic wheel offering ease of spoke tensioning.

This object is solved by an attachment for two-wheeled vehicles having the features of claim 1 and by a wheel having the features of claim 14. Preferred specific embodiments of the invention are the subjects of the subclaims. Further advantages and characteristics of the invention can be taken from the embodiments.

The attachment according to the invention for two-wheeled vehicles comprises at least one cover cap and is in particular suited to be used with bicycles or the like. The cover cap is provided and intended to cover the portion of a spoke nipple protruding radially inwardly from a rim. The cover cap is configured small in structure and aerodynamic in shape. To this end, the cover cap length in the peripheral direction is larger than the cover cap width such that an aerodynamically efficient shape is obtained.

The inventive attachment has many advantages. One considerable advantage is that the cover cap masks the portion of a spoke nipple protruding radially inwardly from a rim so as to largely minimize air turbulences in this region. By way of surrounding or masking the protruding spoke nipple portion with an inventive cover cap the resulting aerodynamics are substantially improved. A particular advantage in terms of aerodynamics is achieved by the small structure of the cover cap. It is in particular provided such that although it covers the entire spoke nipple, it is not significantly larger or higher than the spoke nipple. The small structure also allows to keep the cover cap weight very low.

To ensure sufficient stability of the attachment without needlessly increasing the weight of the bicycle, the cover cap preferably consists of plastic, in particular of fiber-reinforced plastic.

In preferred embodiments the lateral shape, i.e. the side view of the cover cap, is substantially triangular. What is particularly preferred is a thorn-shaped configuration which may be defined by the shape of a shark tooth. The cover cap is in particular a continuous extension of the shape of the rim.

To achieve particularly good results in terms of aerodynamics, the cover cap base, i.e. its side abutting or resting on the rim, is preferably at least slightly convex so as to match the rim curvature. In this way no air turbulences between the rim and the cover cap can arise.

It is of course particularly preferred for the cover cap to have the smallest possible size. In this way the weight and drag are minimized. A width of the lateral basis or of the basis in a lateral view, and a height of the cover cap between approximately 8 mm and 35 mm, in particular between approximately 10 mm and 25 mm, is advantageous. The cover cap may be manufactured in any other conceivable and sensible dimensions.

In further preferred configurations the mounted cover cap length in the peripheral direction is larger than the cover cap height in the radial direction. Thus the cover cap may for example be optimally fitted in the inner rim radius. Thus the cover cap height may be kept very low.

Another advantage is that the cover cap height is less than twice the spoke nipple height. This again allows to obtain aerodynamically particularly advantageous cover cap proportions.

The cover cap according to the invention serves for improved aerodynamics. It is certainly particularly preferred for the cover cap to be configured particularly narrow and aerodynamical. Therefore it is in particular preferably shaped highly aerodynamical from a front view.

In the transverse cross-section of the spoke the inventive cover cap preferably has an elliptical, drop, or rhombus shape.

To fasten the cover cap to the spoke and/or the spoke nipple, an opening through the cover cap is provided. It may advantageously be matched to the diameter of the spoke and/or the spoke nipple. What is also conceivable and possible in other preferred configurations is an opening of a flexible configuration allowing the mounting of spokes and spoke nipples of different diameters.

To eliminate additional fasteners and to movably fasten the cover cap the tolerance between the cover cap opening and the spoke diameter or diameter of the protruding spoke nipple portion is very low. In relation to the preferred configuration a difference between the diameters of 0.0-0.1 mm is provided. Although the cover cap may be frictionally held to the spoke nipple in this way it is not firmly connected therewith. Larger tolerances are likewise possible. Smaller tolerances are likewise possible for spoke nipples manufactured e.g. of a stretchable material. This type of fastening allows easy displacement along the spoke of the cover cap from the adjusting portion of the spoke nipple for readjusting the spoke tension, thus exposing said cover cap.

To ensure easy assembly or also very easy retrofitting of the inventive cover cap, the cover cap is preferably not manufactured integrally but consists of at least two parts. In this way the at least two parts can be attached to the spoke of a fully mounted wheel. To this end the parts of the cover cap are preferably manufactured such that they can be glued or clicked together. Other joining techniques are likewise conceivable and possible.

To avoid removing the cover cap for readjusting the spoke tension, preferred configurations may provide for the spoke tensioning tool to be incorporated in the cover cap. It is for example possible for the opening of the cover cap on the nipple side to be the precise stamp of the spoke nipple adjusting portion. In this way rotating the cover cap may serve to increase or else release the spoke tension. Other configurations are certainly conceivable as well.

Or else it is preferred for the cover cap to consist of a reflective material at least in part. It may be manufactured from a reflective material or else reflective coating or reflective paint may be conveniently employed.

An inventive wheel for two-wheeled vehicles, in particular for bicycles comprises a hub, a rim, and separate spokes connecting the hub and the rim. The spokes are connected with spoke nipples extending through the rim. The portions of the spoke nipple protruding radially inwardly from the rim are covered. In this way the aerodynamics of the wheel are highly improved. Cover caps as they have been described above are particularly suitable for covering.

In preferred configurations the wheel spokes may be configured as blade spokes having a flattened spoke body. This again allows to still further improve aerodynamics.

BRIEF DESCRIPTION OF THE DRAWINGS

Other advantageous features and configurations of the invention can be taken from the following embodiment which will now be described with reference to the enclosed figures.

These show in:

FIG. 1 a schematic side view of a wheel according to the invention;

FIG. 2 a schematic detail view of a spoke nipple with the cover cap pulled off in cross-section;

FIG. 3 a view according to FIG. 2 with the cover cap in place;

DETAILED DESCRIPTION

Figure 4:
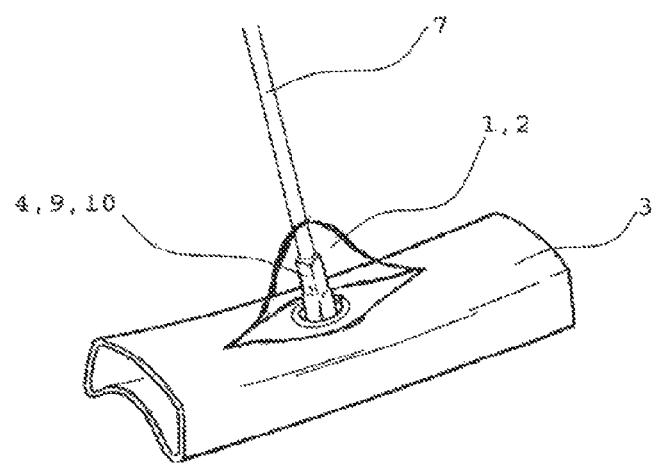
FIG. 4 a schematic detail view of a covered spoke nipple in a lateral top view.

FIG. 1 shows a wheel 5 according to the invention for a bicycle. This wheel 5 consists of a central hub 6 with flanges 12 attached to both of its ends for fastening spokes 7. The spokes 7 are hooked into dedicated holes 13 in the flanges 12. On the other side the spokes 7 are screwed into a spoke nipple 4 (see e.g. FIG. 2) which is guided through the rim 3. To this end the spoke comprises on the side facing the spoke nipple a thread to be threaded into an inner thread in the spoke nipple 4.

The spoke nipple 4 protrudes radially inwardly from the rim 3, in FIG. 1 being covered by a cover cap 2 according to the invention. Aerodynamics are improved by way of covering the spoke nipple 4 protruding from the rim 3 since air turbulences are prevented from forming at the spoke nipple protruding from the rim and air turbulences at the cover cap are distinctly reduced. The cover caps cause the wheel to appear "toothed".

FIG. 2 shows a section of the portion of a rim 3 through which a spoke nipple 4 is guided. The spoke nipple comprises a portion 11 lying in the rim 3 and a portion 9 protruding radially inwardly from the rim 3. The spoke 7 is screwed into the external portion 9 of the spoke nipple 4.

The screw head 14 of the spoke nipple 4 may be used for mounting the spoke 7. However, when the rim tape, the tube and the jacket of the wheel 5 are mounted this screw head is no longer accessible. Re-tensioning the spokes 7 is still feasible though by means of the adjusting portion 10 of the spoke nipple. This portion 10 comprises flat surfaces to which a dedicated tool can be applied so as to allow tensioning or releasing the spoke 7.

In FIG. 2 the cover cap 2 according to the invention is placed on the spoke 7 although it has not yet been pushed down over the portion 9 of the spoke nipple 4 protruding from the rim 3.

Mounting the cover cap 2 according to the invention is illustrated in the embodiment in FIG. 3. The cover cap is in immediate contact with the rim, entirely covering the external portion 9 of the spoke nipple. In this way considerably improved aerodynamics are achieved.

Another view of a preferred configuration is illustrated in FIG. 4. Again one can see a cover cap 2 according to the invention covering the portion 9 of a spoke nipple 4 protruding from the rim 3.

Figure 5:
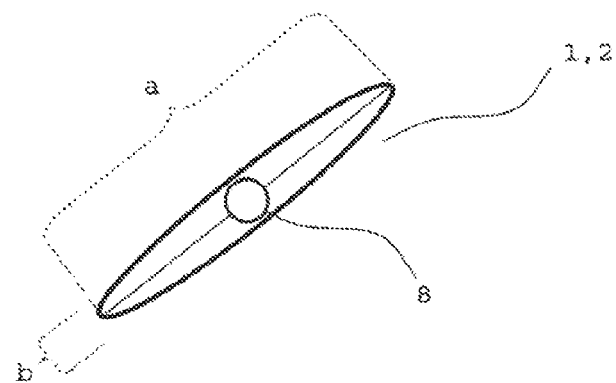
FIG. 5 a schematic top view of a cover cap according to the invention.

FIG. 5 shows a schematic top view of a cover cap 2 according to the invention. It shows as well the opening 8 through which the spoke is guided and which is placed onto, thus covering, the portion 9 of the spoke nipple 4 protruding from the rim 3. This opening 8 may be configured to be flexible so as to allow mounting to different size spokes and spoke nipples.

The cover cap is provided small in structure for reasons of aerodynamics. It is preferred for the length a of the cover cap 2 to be larger in the peripheral direction than the width b of the cover cap 2.

In other configurations this opening 8 may vary in diameter across the height of the cover cap 8. It is conceivable for the basal portion to have a diameter so as to allow optimal placement on the external portion 9 of the spoke nipple 4. The radially further inwardly portion of the cover cap 2 might in turn be matched to the diameter of the spoke 7.

For all of the configurations it is preferred, however, for the diameter of the opening 8 to be up to 0.1 mm larger or perhaps even not at all larger than the diameter of the outwardly portion 9 of the spoke nipple 4 or the spoke 7. Although this allows pulling the cover cap 2 off the spoke nipple, the cover cap is secured to the spoke nipple 4 by frictional grip. The mobile arrangement of the cover cap 2 allows the adjustment portion 10 of the spoke nipple 4 to be exposed as needed so as to allow easy and fast re-tensioning of the spokes 7.

Figure 6:
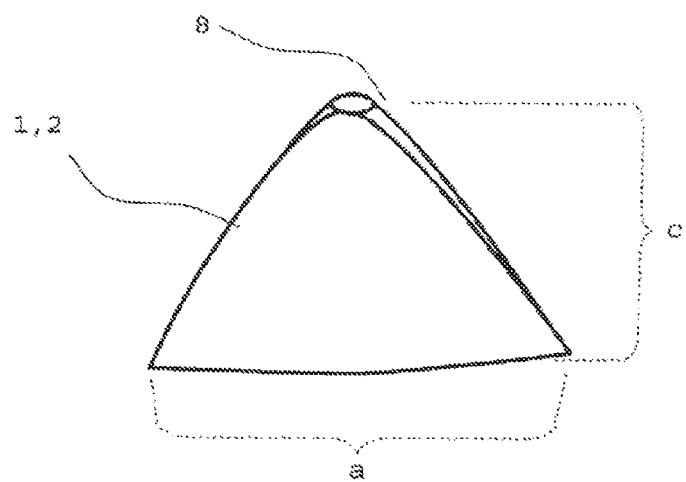
FIG. 6 a schematic side view of a cover cap according to the invention.

FIG. 6 illustrates the schematic side view of a cover cap 2 according to the invention. In the upper area of the cover cap one can recognize the aperture 8 for a spoke 7. It is similar to a thorn or a shark tooth in shape. In the presently illustrated embodiment the height c and the width a of the cover cap are about the same. In other configurations it may be advantageous for the cover cap to have a width a that is larger than the height c.

Figure 7:
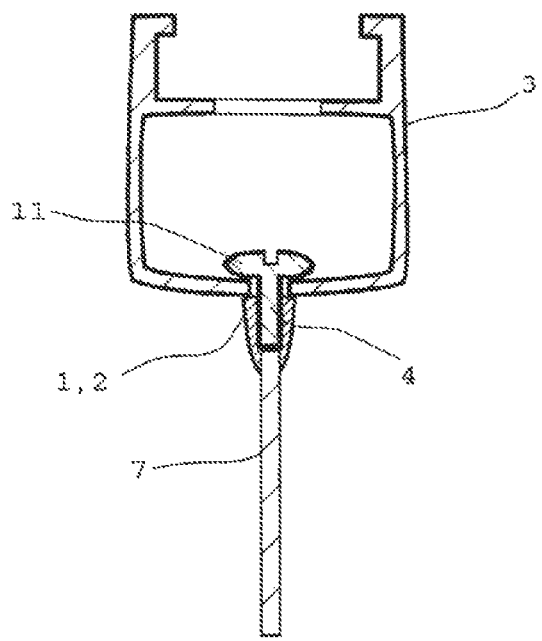
FIG. 7 a schematic cross-section through a rim with a spoke, a spoke nipple and a cover cap.

Another schematic view of a cover cap according to the invention is illustrated in FIG. 7. One can see a section through a rim 3 in the region of a spoke 7. When assembling the spokes 7 may readily be tensioned via the area 11 of the spoke nipple lying in the rim 3.

One can clearly see the small structure and very slim shape of the cover cap 2 which results in excellent aerodynamics.

Figure 8:
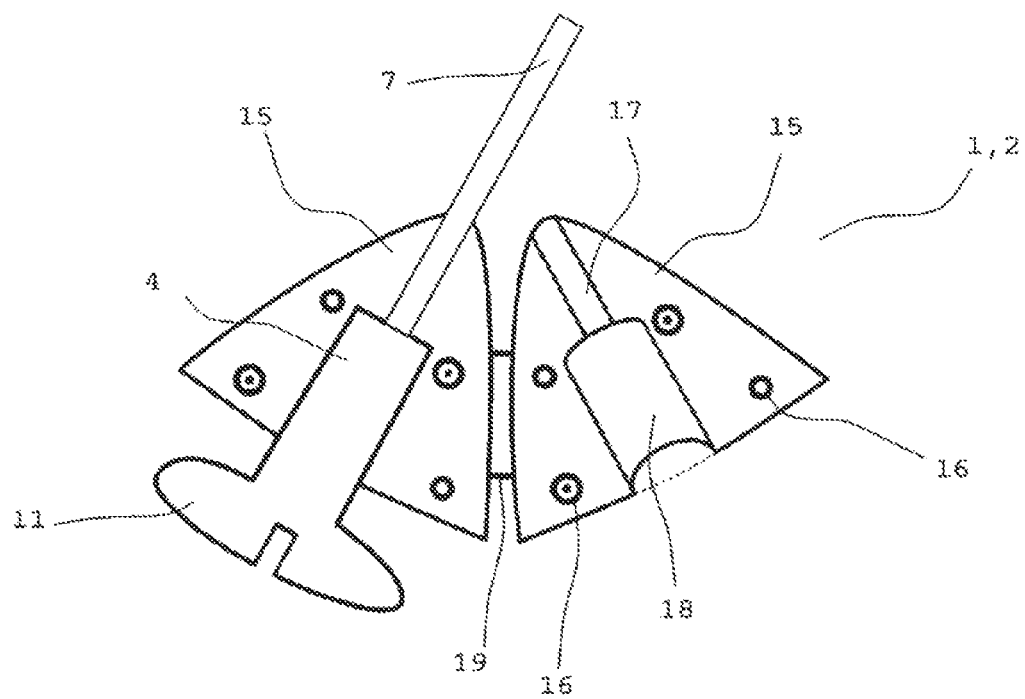
FIG. 8 a schematic view of a spoke with a cover cap according to the invention during mounting.

FIG. 8 illustrates the mounting of a cover cap 2 according to the invention to a spoke nipple 4. The cover cap is configured in two parts, in this example consisting of two identical halves 15 interconnected via a pair of connectors 19. Although these connectors are not inevitably essential, they do facilitate assembly.

A spoke nipple 4 having a spoke 7 is placed into the corresponding receptacles 17, 18 in the left half 15. Now the right half 15 of the cover cap 2 must be folded over the left half 15 so as to snap in by way of the fastening mechanism 16. Other fastening methods are certainly conceivable. The two halves may be glued, pressure-joined, or connected in another way.

In particular conceivable advantageous configurations in which the tensioning tool is immediately incorporated in the cover cap 2 allow particularly simple and fast adjusting of the spoke tension.

LIST OF REFERENCE NUMBERS 1 attachment
2 cover cap
3 rim
4 spoke nipple
5 wheel
6 hub
7 spoke
8 opening
9 spoke nipple portion protruding from the rim
10 adjusting range
11 spoke nipple portion lying inside the rim
12 flange
13 hole
14 screw head
15 cover cap half
16 fastening mechanism
17 spoke receptacle
18 spoke nipple receptacle
19 connector
a length in the peripheral direction
b width
c height in the radial direction

The invention claimed is:

1. An attachment for two-wheeled vehicles, comprising: at least one cover cap provided and intended for covering a portion of a spoke nipple projecting radially inwardly from a rim, the at least one cover cap being configured small in structure and aerodynamically-shaped and having a length (a) in a peripheral direction that is larger than a width (b), wherein a shape of the at least one cover cap in a lateral view is substantially distinctly triangular, wherein the width and a height (c) in the radial direction of the at least one cover cap lie between 10 mm and 30 mm and wherein the height (c) is less than twice the height of the spoke nipple.

2. The attachment according to claim 1, wherein the at least one cover cap comprises fiber-reinforced plastic.

3. The attachment according to claim 1, wherein the shape of the at least one cover cap in a lateral view is substantially distinctly thorn-shaped.

4. The attachment according to claim 1, wherein a side of the at least one cover cap lying on the rim is matched to a curvature of.

5. The attachment according to claim 1, wherein the length (a) of the at least one cover cap in the peripheral direction is larger than the height (c) in the radial direction.

6. The attachment according to claim 1, wherein the at least one cover cap is formed aerodynamically from a front view, and wherein the at least cover cap is approximately elliptical, drop-shaped or rhombus-shaped in cross-section transverse to the spoke.

7. The attachment according to claim 1, wherein the at least one cover cap comprises, in a central region, an opening that is matched to a diameter of the spoke and a protruding portion of the spoke nipple, and configured flexible for different diameters.

8. The attachment according to claim 1, wherein a tolerance of 0 mm to 0.1 mm is provided between the opening and one of the spoke diameter and the diameter of the protruding spoke nipple portion.

9. The attachment according to claim 1, wherein the at least one cover cap is configured at least with two parts to be glued or connected together.

10. The attachment according to claim 1, wherein a tool for tensioning the rim is incorporated into the at least one cover cap.

11. The attachment according to claim 1, wherein the at least one cover cap at least partially comprises of a reflective material.

12. A wheel for a two-wheeled vehicle having a hub, a rim and separate spokes connecting the hub and the rim, comprising: portions of spoke nipples protruding radially inwardly from the rim are covered by cover caps according to claim 1.

13. The wheel according to claim 12, wherein the spokes are configured as blade spokes each having a flattened spoke body.

* * * * *